United States Patent [19]
Mine et al.

[11] Patent Number: 5,498,109
[45] Date of Patent: Mar. 12, 1996

[54] DRILLING APPARATUS OF HARD BRITTLE MATERIAL AND METHOD THEREOF

[75] Inventors: Toshihiro Mine; Shinichi Kazui, both of Hadano; Kenji Morita, Isehara; Hiroyuki Ogino; Takeji Shiokawa, both of Kanagawa; Hideaki Sasaki, Hadano, all of Japan

[73] Assignee: Hitachi, Ltd.

[21] Appl. No.: 215,054

[22] Filed: Mar. 21, 1994

[30] Foreign Application Priority Data

Mar. 25, 1993 [JP] Japan ..................... 5-066426

[51] Int. Cl.⁶ .............. B23B 35/00; B23B 39/00
[52] U.S. Cl. ................. 408/1 R; 279/20; 408/6; 408/57
[58] Field of Search ................ 269/21; 279/20, 279/42, 48; 408/1 R, 57, 59, 6, 7, 11, 12

[56] References Cited

U.S. PATENT DOCUMENTS

| | | | |
|---|---|---|---|
| 1,839,569 | 1/1932 | Lovejoy | 279/42 |
| 3,791,660 | 2/1974 | Bostley | 408/59 |
| 4,396,317 | 8/1983 | Staron et al. | 408/59 |
| 4,562,329 | 12/1985 | Minton | 279/42 |
| 5,020,946 | 6/1991 | Nann | 279/20 |
| 5,141,212 | 8/1992 | Beeding | 269/21 |
| 5,222,719 | 6/1993 | Effner | 269/21 |

FOREIGN PATENT DOCUMENTS 4-244382 9/1992 Japan.

OTHER PUBLICATIONS

Machine Technology, vol. 35, No. 2, pp. 36–43.

*Primary Examiner*—Daniel W. Howell
*Attorney, Agent, or Firm*—Evenson, McKeown, Edwards & Lenahan

[57] ABSTRACT

A drilling method and a drilling apparatus of a hard brittle material in which a core drill is used for abrasive grinding of high accuracy and high durability. Therefore, the structure of this invention comprises: a tubular core drill; a collet chuck for holding the core drill, including a chuck main body of an integral shape which is hollow, a seal joint provided on the chuck at the inlet side of the lubricant, a slit portion of a pin vise type for holding the core drill, which slit portion is provided on the chuck at the outlet side of the lubricant, and a seal portion provided axially inside of the slit portion, which seal portion has an inner diameter substantially equal to an outer diameter of the core drill applied to the seal portion, and a threaded portion formed on the outer periphery of a portion further axially inside of the seal portion, so that after inserting the core drill into the seal portion, a fastening nut is engaged with and tightened on the threaded portion to thereby seal and fix the core drill, and that the lubricant at a high pressure can be supplied into a central space of the core drill; and a structure for delivering the lubricant through the inner passage of the core drill.

19 Claims, 7 Drawing Sheets

INTERNALLY SUPPLIED HIGH-PRESSURE LUBRICANT

DRILLING APPARATUS OF HARD BRITTLE MATERIAL AND METHOD THEREOF

BACKGROUND OF THE INVENTION

The present invention relates to a drilling apparatus of a hard brittle material such as ceramics and a method thereof in which a holder having an inner conduit through which lubricant is supplied for cooling and removing chips from a workpiece is used for holding a tool and is sealed to prevent leakage of the internally supplied lubricant during drilling with a core drill, and it also relates to a drilling apparatus of a hard brittle material and a method thereof including a system to detect abnormality by measuring the load from the core drill during drilling. This invention can be applied to drilling technology in the field of various industrial products such as automobiles, electronic devices and so forth which include parts made of hard brittle materials.

In order to drill a hole (especially of a small diameter) in a hard brittle material such as ceramics, machining methods in which diamond is used as abrasive grains are mainly employed. In such machining, floating abrasive grains and fixed abrasive grains are used. The former is used for ultrasonic machining disclosed in, for example, "Machine Technology", Vol. 35, No. 2. However, this ultrasonic machining involves a problem in the relationship between the tool durability for maintaining the accuracy and a decrease in the operation efficiency, and a problem of processing and disposing the abrasive grains in the method of floating abrasive grains. On the other hand, the latter is used for abrasive grinding, and a mounted wheel is a typical example. In this case, however, as the mounted wheel is solid, it is necessary to remove the whole material corresponding to a hole while drilling, and thus, cooling is difficult. Therefore, the mounted wheel has a short durability. A hollow tubular core drill is intended for solving the problem of this mounted wheel (see Japanese Patent Unexamined Publication No. 4-244382). However, in order to utilize the drilling method with such a core drill effectively, three components, i.e., a core drill, a collet chuck for holding the core drill, and a structure for delivering lubricant through their inner conduit must be provided.

In the conventional technology, the machining efficiency in particular has been inadequate for drilling a large number of holes. As for the core drill, there has been no collet chuck which can endure the internally supplied lubricant at a high pressure of 40 kgf/cm$^2$ when a hard brittle material such as ceramics is drilled.

SUMMARY OF THE INVENTION

The present invention enables effective drilling because a core drill is used as a tool so that cooling and removal of chips from a workpiece can be effected by supplying lubricant through an inner conduit of the tool. Since the core drill is hollow, only the peripheral portion of the drill performs abrasive grinding, and the grinding area is small. Consequently, the volume to be drilled and removed is small while drilling, and the central portion which has conventionally taken the longest time to remove need not be ground, so that accordingly efficient drilling can be carried out. The invention provides an apparatus and a method for such excellent drilling. Moreover, by devising technical means for controlling a deviation (i.e., deflection) of the drill and uniforming the machining surface of the core drill, the invention can provide more efficient drilling.

Furthermore, the invention also provides a drilling system including a control unit to detect abnormality in the core drill and the drilling quality beforehand by measuring the load from the core drill during drilling.

In order to achieve the foregoing objects, abrasive grinding with a core drill is employed for drilling a hard brittle material. A characteristic of the present invention is the provision of a collet chuck which can hold the core drill with high accuracy (so that a deflection or deviation of the core drill after held by the chuck is 15 µm or less) and which can be sealed to prevent leakage of internally supplied high-pressure lubricant. This collet chuck serves to hold a tubular core drill, and a main body of the chuck has an integral shape and is hollow to allow lubricant to flow inside of the chuck main body. A seal joint is provided on the chuck at the inlet side of the lubricant, and a slit-portion of a pin-vise type for holding the core drill is provided on the chuck at the outlet side of the lubricant. A seal portion provided axially inside of the slit portion has an inner diameter substantially equal to an outer diameter of the core drill applied to the seal portion, and includes a threaded portion formed on the outer periphery of a portion further axially inside of the seal portion, so that after inserting the core drill into the seal portion, a fastening nut is engaged with the threaded portion and tightened on the slit portion to thereby fix and seal the core drill, and that the lubricant at a high pressure can be supplied into a central space of the core drill.

Highly accurate and highly efficient drilling can be realized by providing the core drill, the internally supplied lubricant and the collet chuck in a proper structure and devising the drilling process. The drilling process is devised as follows: The pressure of the internally supplied lubricant is made not lower than 40 kgf/cm$^2$. From the first hole to the Nth hole, a drilling start portion is drilled (to a depth $\Delta$h mm) at a speed $F_1$, and then drilling is performed at a speed $F_2$ ($>5F^1$) after the depth exceeds $\Delta$h. From the (N+1)th hole, drilling is performed at a speed $F_3$ ($>2F_2$). That is to say, dimensional adjustment of the core drill is conducted while drilling a certain number of workpieces, and drilling at the high speed $F_3$ starts from the (N+1)th hole.

As for detection of the load, grinding resistance detecting sensors are embedded in a table. Thus, the load during drilling is detected in real time, and a change of the load is controlled.

Moreover, in order to achieve the foregoing objects, a drilling apparatus of a hard brittle material according to the invention is employed. This apparatus comprises a tubular core drill, a collet chuck of a pin-vise type for holding the core drill, a high-pressure lubricant supply/discharge device which causes lubricant to flow inside of the collet chuck and to discharge, vacuum chuck type table means on which a workpiece is held, vacuum means for supplying vacuum to the vacuum chuck type table means, a device for holding the collet chuck and moving and driving it to perform drilling, and a control unit for controlling the drive device or the like.

The table means may comprise a first table member on which a workpiece is held, and a second table member which includes at least one load sensor provided therein.

The control unit may carry out the control by detecting abnormality in response to a signal from this load sensor.

Further, the control unit may raise the alarm and stop drilling when the grinding resistance value during drilling changes, by a predetermined degree or more, from a characteristic curve of a reference grinding resistance value ($F_n$) and the number of drilled holes (n).

In the case of drilling with the core drill, a method of holding the core drill with high accuracy and the tightness of the collet chuck for utilizing the internally supplied lubricant effectively are important factors. As for the former, a holding force to hold the core drill highly accurately without deforming the tubular part of the core drill and also to withstand the load during grinding is required. The holder portion is of a pin-vise type, to thereby satisfy the foregoing requirement. As for the latter, the collet chuck is completely sealed to prevent leakage of the internally supplied lubricant, by the seal with an O-ring on the collet chuck at the inlet portion of the internally supplied high-pressure lubricant and by the seal through tightening of the pin vise.

In relation to the load detection, at least one grinding resistance detecting sensor is embedded in the drilling table in such a manner that the load detection can be performed even if the drilling position is located at a desired position on the table.

DETAILED DESCRIPTION OF THE PREFERRED EMBODIMENTS

The present invention will be hereinafter described in detail on the basis of the preferred embodiments with reference to the attached drawings.

Figure 12:
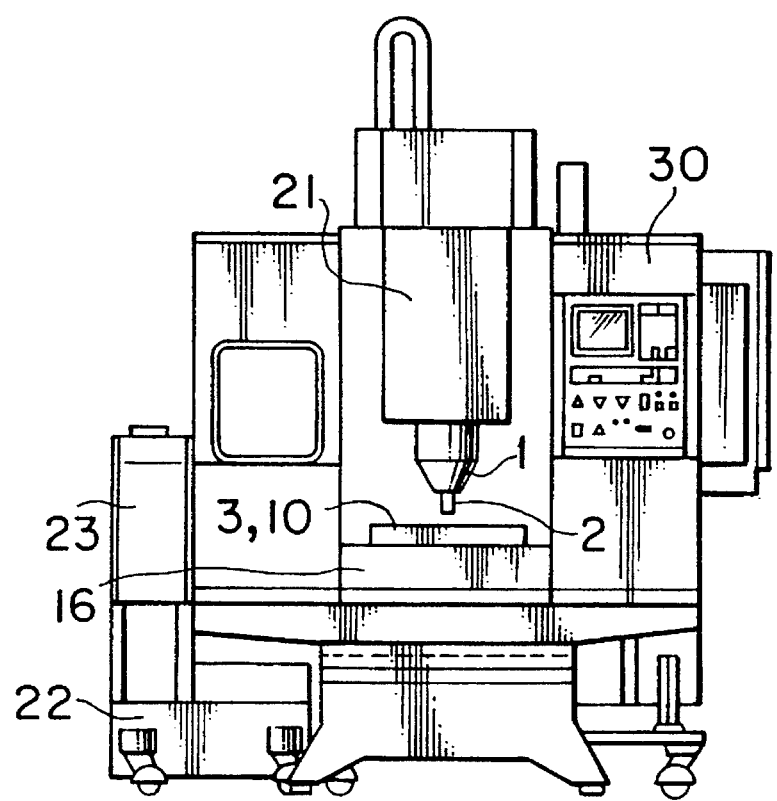
FIG. 12 is a schematic front view showing one embodiment of a drilling apparatus according to the invention.

FIG. 12 shows one embodiment of a drilling apparatus according to this invention. As shown in the figure, the drilling apparatus generally comprises a core drill 2 for drilling a hard brittle material, a collet chuck 1 of a pin-vise type for holding the core drill 2, a main spindle 21 which holds the chuck 1 and is vertically movable, and a drive device (not shown) for rotating the chuck 1.

The drilling apparatus also includes vacuum chuck type tables 3, 10 on which a workpiece 11 is held, a vacuum device or a vacuum source 17 for supplying vacuum to these tables, and a bed 16 on which the tables are mounted and which can be moved on a horizontal plane. In order to detect the grinding resistance during drilling, at least one or most preferably four load sensors 9 may be embedded in the vacuum chuck type tables 3, 10.

Further, the drilling apparatus includes a high-pressure lubricant supply/discharge device which causes high-pressure lubricant to flow from the collet chuck 1 into an inner passage of the core drill 2 during drilling. As this device, there are provided a lubricant tank 22, a lubricant feed pump 23, a high-pressure pump (not shown), and piping and so forth for connecting them to the respective devices.

Operations of the foregoing devices are controlled by a control unit 30 to perform drilling. Needless to say, it is possible to carry out this drilling work preferably continuously and automatically by inputting programs in the control unit 30.

Figure 1:
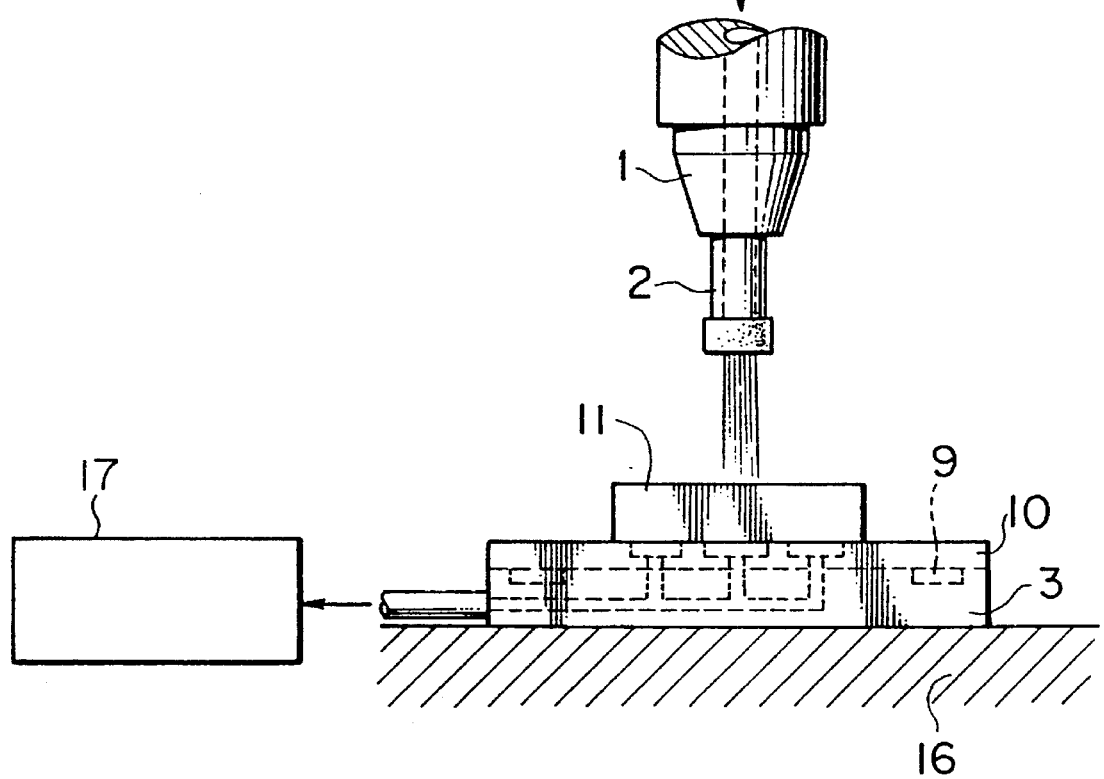
FIG. 1 is a schematic view showing the structure in a drilling apparatus according to the present invention.

In this embodiment, a blind hole having a diameter of 2 mm and a depth of 4 mm is drilled in a ceramic material of Hv 1100. The rotational speed during drilling is 10000 round/minute, the peripheral speed of the core drill is 63 m/minute, and a water-soluble cooling lubricant is employed. FIG. 1 is a schematic view showing the structure of a drilling portion in a drilling apparatus according to the present invention. The collet chuck 1, which is fixed on the main spindle 21 of the apparatus, chucks the core drill 2 and allows the high-pressure lubricant to flow inside of the core drill 2. The workpiece holding table 10 is placed on the vacuum chuck type table 3 including the grinding resistance sensors for detecting the grinding resistance of the core drill 2, and then, the workpiece 11 is held on the table 10, to thereby drill it.

Figure 2:
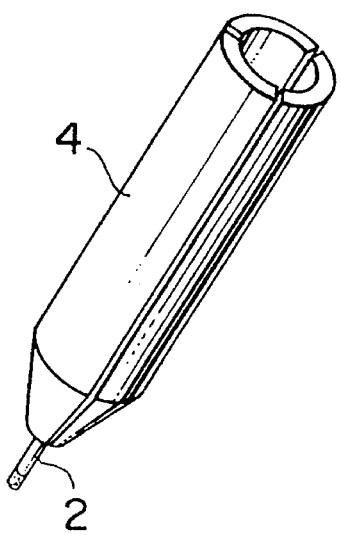
FIG. 2 is a perspective view showing a collet chuck divided in three sections.
Figure 3:
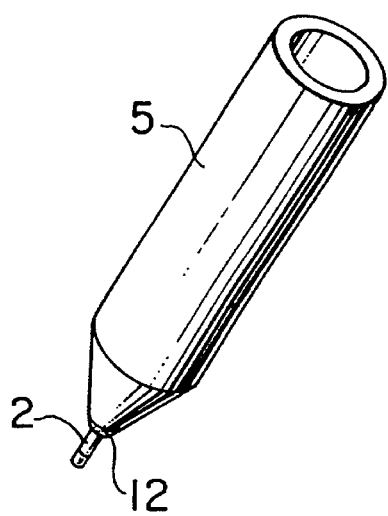
FIG. 3 is a perspective view showing a collet chuck for resin adhesion.
Figure 4:
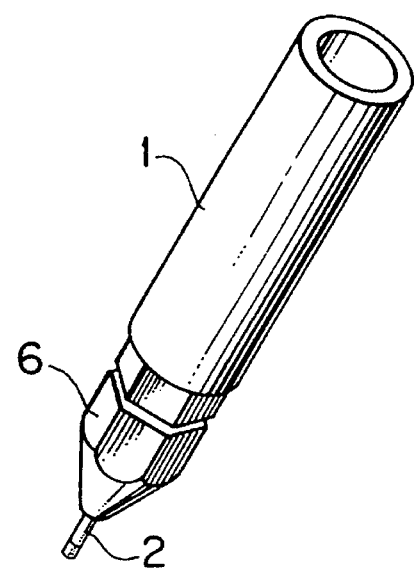
FIG. 4 is a perspective view showing a collet chuck according to the invention.

FIGS. 2, 3 and 4 show three kinds of collet chucks for this type of drilling. Important factors for such a collet chuck are the accuracy in chucking the core drill and the tightness. The collet chuck shown in FIG. 2 is a slit type designed to improve the chucking accuracy. In this case, the tightness of the collet chuck is inferior. Although the slit portion is formed of epoxy resin for enhancing the tightness, the pressure of the internally supplied lubricant is as low as 10 to 20 kgf/cm$^2$ and the tightness is not sufficient.

FIG. 3 shows a collet chuck designed to improve the tightness. Since it has no slit portion, the tightness is improved, and an internally supplied lubricant pressure of 40 kgf/cm$^2$ can be obtained. However, the chucking force is not sufficient because the core drill is chucked through adhesion by epoxy resin 12, and there arises a phenomenon that the core drill sinks during drilling.

Figure 5A:
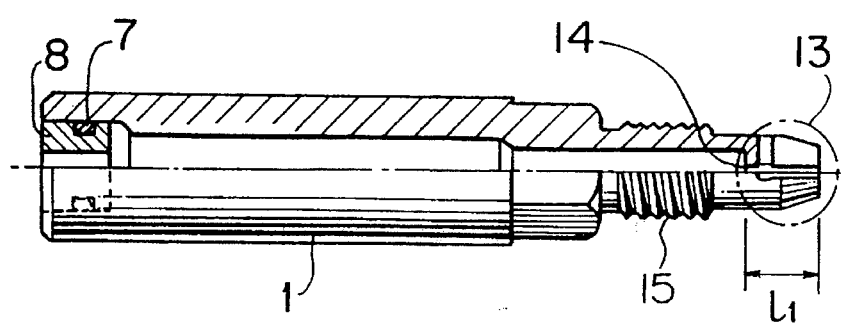
FIGS. 5A and 5B are a plan view and a side view showing the collet chuck according to the invention.
Figure 5B:
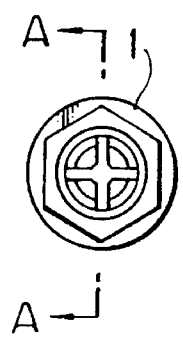

FIG. 4 shows a collet chuck according to the present invention which has both the advantages of the foregoing two collet chucks. The invention collet chuck is shown more specifically in FIGS. 5A and 5B. High tightness of the collet chuck on the lubricant inlet side is maintained by an O-ring 7, as shown in FIG. 5A. In a slit portion 13 on the lubricant outlet side, a tubular part of the core drill is adjusted by gauging, and consequently, the gap between the chuck and the core drill is about 5 μm. The core grindstone is inserted in a seal portion 14 axially inside of the slit portion 13 ($l_1$), which seal portion has an inner diameter substantially equal to an outer diameter of the core drill, so as to prevent leakage from the slit portion 13. Further, in order to increase the tightness of the chuck, a threaded portion 15 is provided on the outer periphery of a portion further axially inside of the seal portion 14 is engaged with and tightened by a fastening nut 6 (e.g., 90 kgf/cm$^2$). Thus, the gap between the chuck and the core drill in the seal portion 14 is minimized. As a result, there can be obtained a sufficient tightness of 40 kgf/cm². Preferably, the collet should be made of a nickel-chrome-molybdenum steel. If it is made of an alloy tool steel, a pin-vise portion might be broken depending upon a handling manner and so forth.

Figure 6:
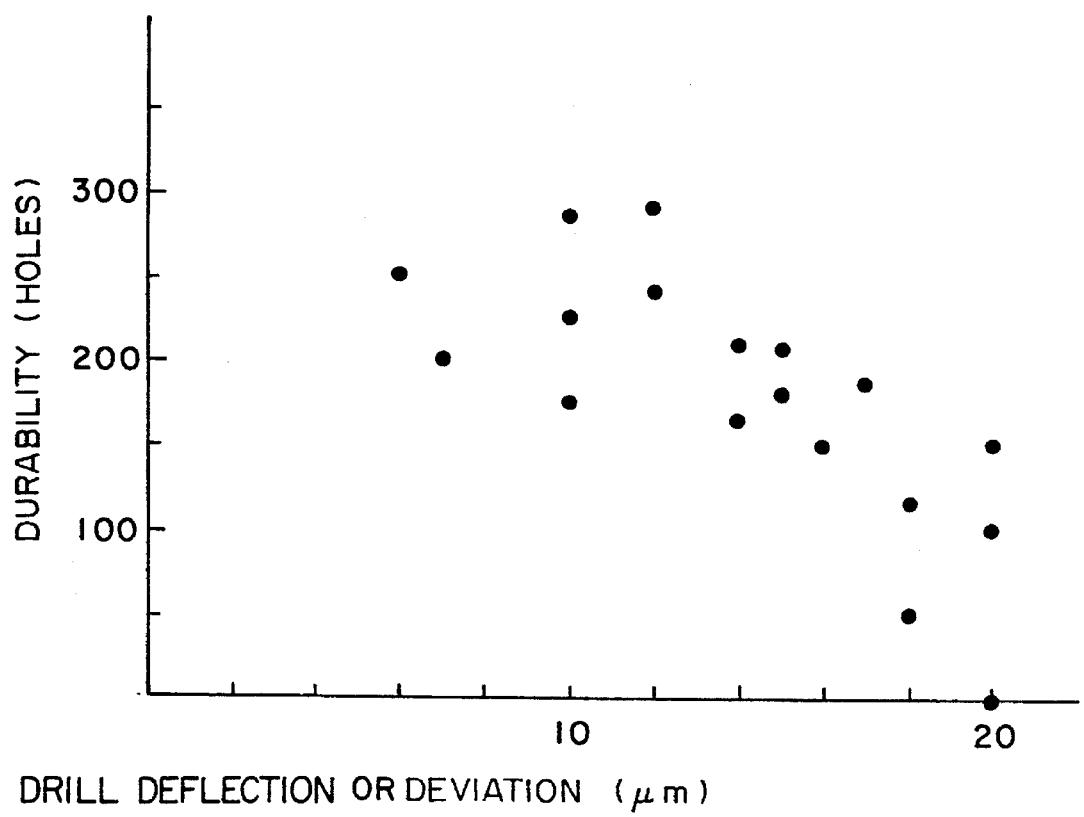
FIG. 6 is a graph showing test data of axial deviations $\delta$ of core drills and durabilities of the core drills.

The deviation or deflection of the distal end of the chucked core drill from the drill axis of rotation is a factor to be considered next. It affects the durability and the drilling quality (causes inlet chipping, partial breakage). FIG. 6 shows the relationship between the deviation and the durability. If the deviation is within 15 μm, the durability is increased. Also, if the deviation is large, the drilling quality is, of course, deteriorated, thereby causing chipping and partial breakage. Therefore, when the deviation is 15 μm or less, there can be provided a drilling apparatus whose durability and drilling quality are both maintained at high levels.

Figure 7:
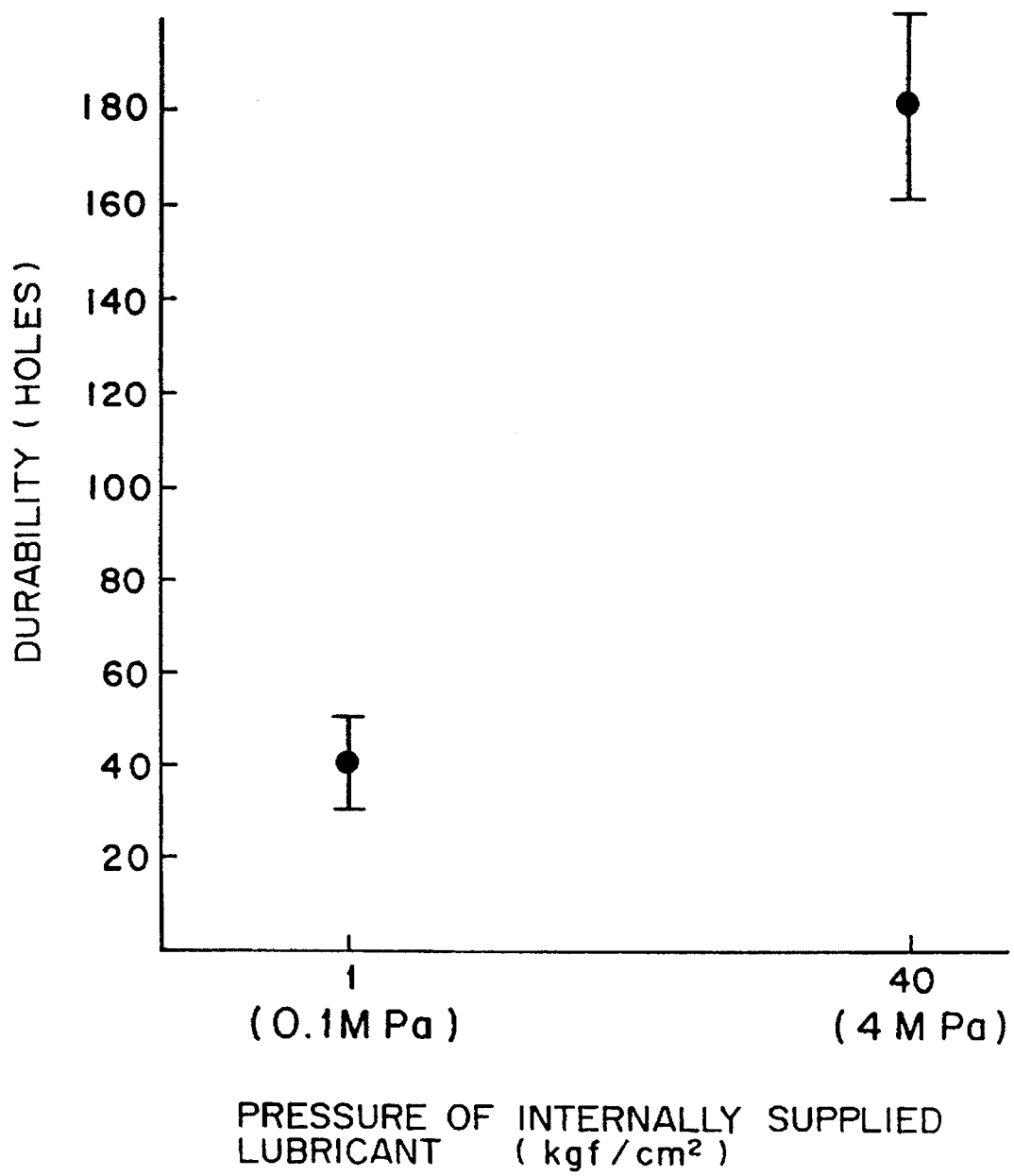
FIG. 7 is a graph showing test data of pressures of internally supplied lubricant and durabilities of the core drills.

On the other hand, FIG. 7 shows an influence of the internally supplied lubricant. As clearly understood from the investigation result, if the internally supplied lubricant is at a low pressure, removal of chips from a workpiece and cooling of the drill are deteriorated so that the durability will not be increased. Therefore, an internally supplied lubricant pressure of 40 kgf/cm² or more is effective.

Figure 8:
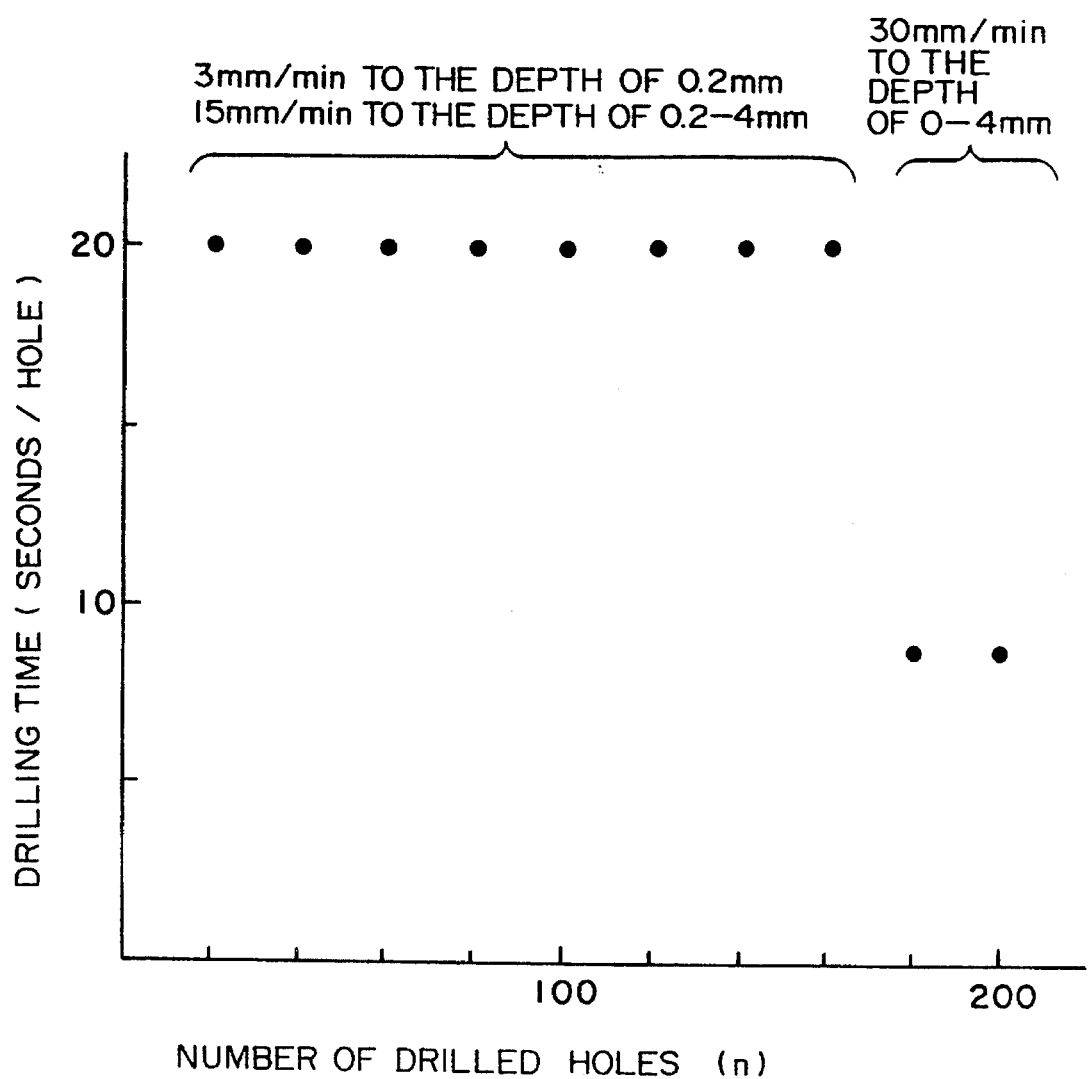
FIG. 8 is a graph of data showing the relationship between the number of drilled holes and drilling time.

Due to irregularity of the core drill itself (a difference in the distal-end shape of diamond abrasive grains or the like), the core drill is introduced into a drilling start portion (having a depth Δh mm) at a low speed $F_1$ mm/min and then is advanced at a speed $F_2$ ($>5F_1$) mm/min after a feed of Δh mm so as to prevent chipping of the ceramic workpiece when the first hole to the Nth hole are drilled. From the (N+1)th hole, the inherent irregularity of the core drill starts to be eliminated. With the core drill from which the inherent irregularity has disappeared, it is possible to advance the core drill at a high speed $F_3$ ($>2F_2>10F_1$) mm/min from the beginning, unlike a new core drill which must be introduced into a drilling start portion at a low speed. Actually, as shown in FIG. 8, drilling time can be shortened.

In consequence, a hard brittle material which is difficult to drill can be drilled with high accuracy and high efficiency.

Figure 9:
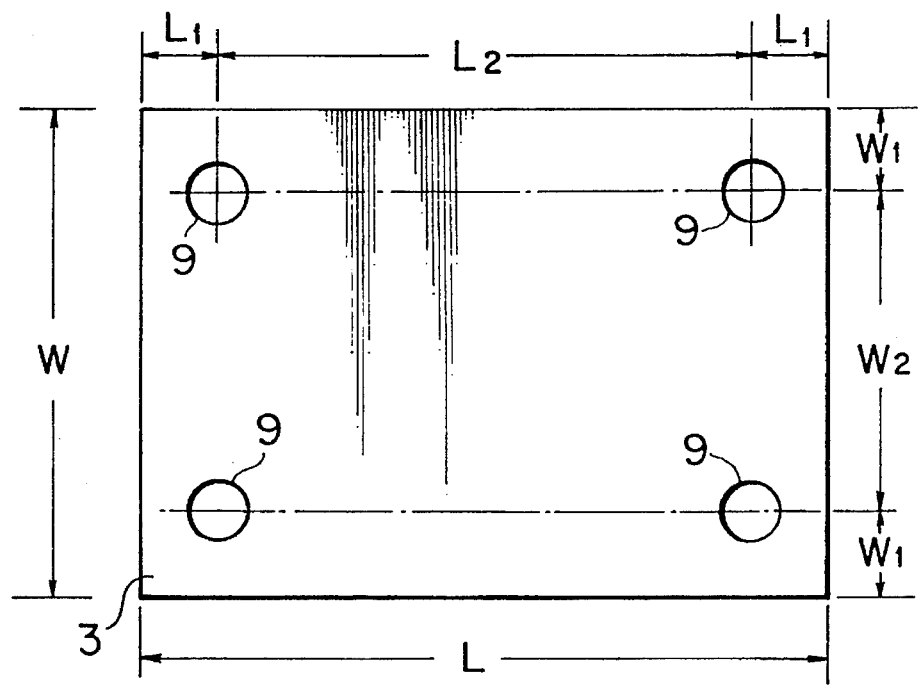
FIG. 9 is a plan view showing a table in which grinding resistance detecting sensors are embedded according to the invention.
Figure 10:
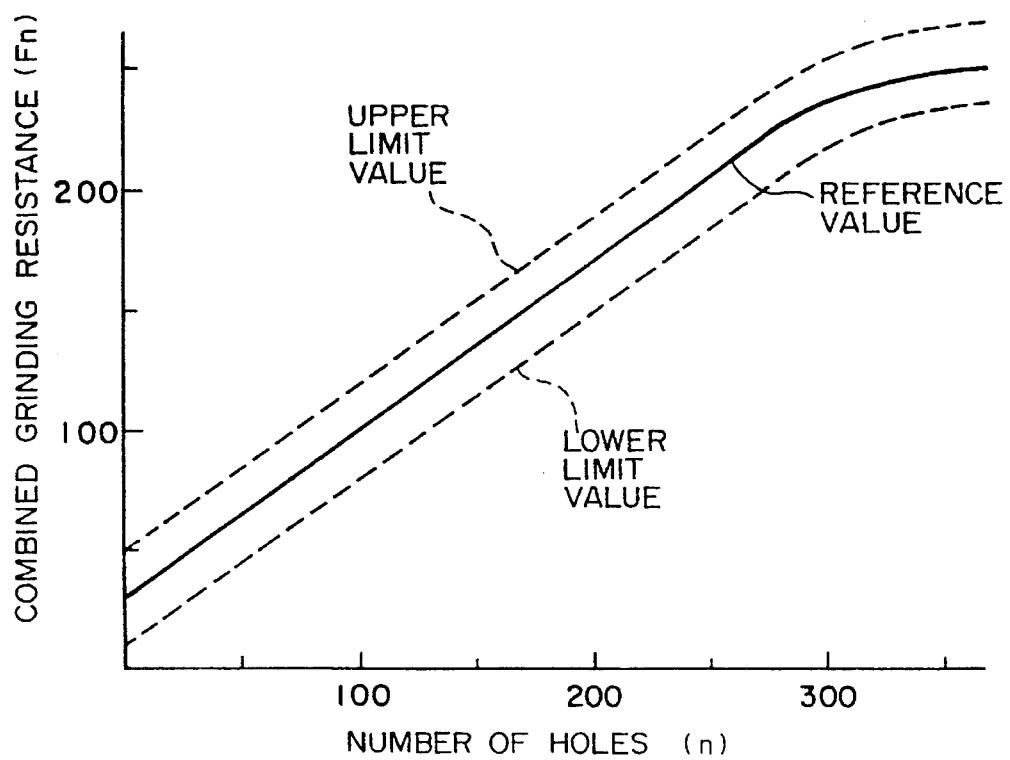
FIG. 10 is a graph of data showing the relationship between the number of drilled holes and combined grinding resistances.

Next, a load detection system will be described. FIG. 9 shows the locations of grinding resistance detecting sensors in the table employed in the present invention. Here, the grinding resistance ($F_n$) means a vertical component force. Four sensors are used and disposed at the locations shown in FIG. 9 so that the grinding resistance ($F_n$) during drilling at any position in the entire drilling area can be detected. In this embodiment, the output of the load is a sum of outputs of the four load sensors. In this embodiment, the load measurement can be carried out by providing, for example, four crystal piezoelectric type force conversion sensors of vertical force detection 90 kN and decomposition 0.01N at such positions that, with respect to a table length L of 400 mm and a table width W of 270 mm, $L_1$ is 0.1L, $L_2$ is 0.8L, $W_1$ is 0.2 W, and $W_2$ is 0.6 W, and that their depth in the table is 12 mm. (Each of the sensors has a diameter of 34.5 mm and a thickness of 12 mm.) FIG. 10 shows an example of relationship of the combined grinding resistance property value Fn-n when drilling is performed with the foregoing load detection system. The grinding resistance (the Fn-n curve) is measured through experiments, and thus, a standard grinding resistance curve is obtained. Abnormal phenomena with respect to this curve are checked through experiments, and upper and lower limit values ±20 [N] are determined. This system functions to discover an abnormality of the core drill beforehand by checking whether or not the grinding resistance during grinding is in a range between the preset upper and lower limit values.

Figure 11:
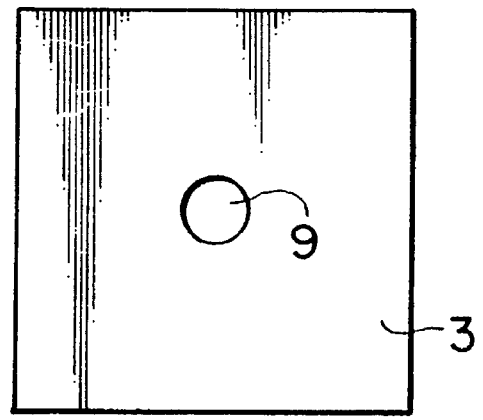
FIG. 11 is a plan view showing a modified embodiment of a table in which a grinding resistance detecting sensor is embedded according to the invention.

In the case of a small table and a small workpiece, as shown in FIG. 11, the measurement can be effected only by a single detection sensor.

As described heretofore, the present invention provides a comprehensive drilling method in which the core drill, the collet chuck and the internally supplied high-pressure lubricant are used for drilling a hard brittle material such as ceramics so that drilling can be conducted with high accuracy and high efficiency, and detection of the load is performed to take safety into consideration. The machining efficiency has been improved to be 20 times as high as the efficiency of the conventional ultrasonic machining which was three minutes/hole owing to vertical movements of the tool for maintaining the accuracy and cooling, and so forth. As compared with the conventional core-drill drilling, the drilling speed has been made 2 to 2.5 times higher, and the durability of the core drill has been made not less than 4.5 times longer. Moreover, since abnormality detection of the core drill can be conducted beforehand, damages of workpieces can be prevented to thereby carry out the machining economically. The improvement in the machining efficiency is highly effective because it leads not only to reduction in drilling time but also to a decrease in the number of machines in production equipment.

What is claimed is:

1. A collet chuck for holding a tubular core drill, comprising:

a chuck main body of an integral shape which is hollow to allow lubricant to flow inside of the chuck main body;

a seal joint provided on the chuck at the inlet side of the lubricant;

a slit portion provided on the chuck at the outlet side of the lubricant for holding said core drill; and a seal portion provided axially inside of said slit portion, which seal portion has an inner diameter substantially equal to an outer diameter of said core drill applied to the seal portion; and a threaded portion formed on the outer periphery of a portion further axially inside of the seal portion, wherein after inserting said core drill into said seal portion, a fastening nut is engaged with and tightened on said threaded portion to thereby fix and seal said core drill, and that the lubricant at a high pressure can be supplied into a central space of said core drill during machining.

2. A drilling method of a hard brittle material, wherein a tubular core drill is held by said collet chuck according to claim 1, and a hole is drilled while lubricant at a high pressure is supplied into a central space of said core drill.

3. A drilling method of a hard brittle material according to claim 2, wherein the pressure of the lubricant is substantially 40 kg/cm² or higher.

4. A drilling method of a hard brittle material according to claim 2, wherein the step of drilling includes maintaining a deflection δ of said core drill attached to said collect chuck at 15 μm or less.

5. A drilling method of a hard brittle material according to claim 2, wherein an advancing speed of said drill is controlled in accordance with the number of drilled holes in such a manner that when holes are drilled from the first hole to a predetermined ordinal number Nth hole, said drill is introduced into a drilling start portion for a depth Δh mm at a speed $F_1$ and then is advanced at a speed $F_2$, after it passes the depth Δh mm, and that from the (N+1)th hole, said drill is advanced at a speed $F_3$ independent of depth.

6. A drilling method of a hard brittle material according to claim 2, wherein at least one load sensor for detecting a grinding resistance is provided in vacuum chuck type drilling table means so that the load resistance of said core drill can be detected at a desired position in a drilling area.

7. A drilling method of a hard brittle material according to claim 6, wherein prior to drilling a workpiece is held on a first table member of said drilling table means and loading is sensed by a second table member of said drilling table means which second table member includes at least one load sensor provided therein and is disposed under the first table member.

8. A drilling method of a hard brittle material according to claim 7, wherein the sensing of load is effected by said second table member which includes four load sensors located at such positions that, with respect to a table length L, a distance $L_1$ from an end portion of the table to the center of a sensor is 0.1L, and a distance $L_2$ between the centers of two sensors is 0.8 L, and with respect to a table width W, a distance $W_1$ from the end portion of the table to the center of a sensor is 0.2 W, and a distance $W_2$ between the centers of two sensors is 0.6 W.

9. A drilling method of a hard brittle material according to claim 7, wherein the sensing of load is effected by a single load sensor provided in a central portion of said second table member.

10. A drilling method of a hard brittle material according to claim 6, wherein abnormality in the qualities of the core drill and the drilled hole is detected in response to a signal from said load sensor which functions when drilling is performed on said table means.

11. A drilling method of a hard brittle material according to claim 10, wherein an alarm is raised and drilling is stopped when the grinding resistance value during drilling changes by a predetermined degree from a characteristic curve between a reference grinding resistance value and the number of drilled holed.

12. A drilling apparatus of a hard brittle material, comprising:

a tubular core drill;

a collet chuck for holding said core drill;

a high-pressure lubricant supply/discharge device which causes lubricant to flow inside of the collet chuck;

a device for holding, moving and driving said collet chuck;

vacuum chuck type table means on which workpiece is held;

vacuum means for supplying vacuum to the table means; and a control unit for controlling said drive device.

13. A drilling apparatus of a hard brittle material according to claim 12, wherein said table means comprises a first table member on which a workpiece is held, and a second table member which includes at least one load sensor provided therein.

14. A drilling apparatus of hard brittle material according to claim 13, wherein said control unit includes means for detecting abnormality in response to a signal from said load sensor.

15. A drilling apparatus of a hard brittle material according to claim 14, wherein said control unit includes means for raising an alarm and stopping drilling when the grinding resistance value during drilling changes by a predetermined degree from a characteristic curve between a reference grinding resistance value and the number of drilled holes.

16. A drilling apparatus of a hard brittle material according to claim 13, wherein said second table member includes four load sensors which are located at such positions that, with respect to a table length L, a distance $L_1$ from an end portion of the table to the center of a sensor is 0.1L, and a distance $L_2$ between the centers of two sensors is 0.8L, and with respect to a table width W, a distance $W_1$ from an end portion of the table to the center of a sensor is 0.2 W, and a distance $W_2$ between the centers of two sensors is 0.6 W.

17. A drilling apparatus of a hard brittle material according to claim 13, wherein a single load sensor is provided in a central portion of said second table member.

18. A drilling apparatus of a hard brittle material according to claim 13, wherein means is provided for detecting abnormality in the qualities of the core drill and the drilled hole in response to a signal from said load sensor which functions when drilling is performed on said table means.

19. A drilling apparatus of a hard brittle material according to claim 18, wherein said control unit includes means for raising alarm and stopping drilling in response to a signal from said load sensor when the grinding resistance value during drilling changes by a predetermined degree from a characteristic curve between a reference grinding resistance value and the number of drilled holes.

\* \* \* \* \*